UNITED STATES PATENT OFFICE.

JAMES TRIPPE, OF ORANGE, NEW JERSEY.

IMPROVED PAINT COMPOSITION.

Specification forming part of Letters Patent No. 45,362, dated December 6, 1864.

*To all whom it may concern:*

Be it known that I, JAMES TRIPPE, of Orange, in the county of Essex and State of New Jersey, have invented a new and Improved Paint Composition; and I do hereby declare that the following is a full, clear, and exact description thereof, which will enable any person skilled in the art to fully understand and use the same.

This invention consists in the manufacture of a white pigment or paint from a white deposit of silica and alumina, with traces of manganese, &c., which are mixed in suitable proportions with white oxide of zinc; or it may be used with white lead, barytes, lime, chalk, whiting, plaster, or any other suitable material.

The deposit of silica and alumina which I use in the manufacture of white paint is found in the form of clay in the State of New Jersey. It is dug in suitable quantities out of the ground, and in order to render it fit for the manufacture of paint I dry it and reduce it to an impalpable powder by suitable machinery. I then mix it with the white oxide of zinc, grinding the two materials together with a suitable quantity of raw linseed-oil. The proportion in which I mix these ingredients together is about as follows: powdered clay, fifty pounds; oxide of zinc, fifty pounds; linseed-oil, three to four gallons. This proportion may, however, be altered considerably, according to the quality of paint to be produced. For the linseed-oil any other suitable oil may be substituted, and, instead of the oxide of zinc, white lead, barytes, or lime, chalk, whiting, or plaster-paris may be used, or any other opaque white material. The clay itself, when mixed with linseed-oil, is somewhat transparent, and when it is applied without the oxide of zinc or other material it will not, as the painters term it, "cover."

The white pigment thus prepared can be used as a basis to manufacture all the various shades of colored paints by mixing it with suitable ingredients, and my paint has the great advantage that it will not, I think, crack when exposed to the elements or to the changes of the atmosphere, and can be manufactured at a much less price than white lead.

I claim as new and desire to secure by Letters Patent—

1. The within-described composition for a white pigment, made of the ingredients specified and mixed together substantially as set forth.

2. The use of a deposit of silica and alumina or white clay in the manufacture of white paint, substantially as described.

JAMES TRIPPE.

Witnesses:
GEORGE CONDIT,
BENJ. F. CAVIN.